US005682493A

United States Patent [19]

Yung et al.

[11] Patent Number: 5,682,493
[45] Date of Patent: Oct. 28, 1997

[54] SCOREBOARD TABLE FOR A COUNTERFLOW PIPELINE PROCESSOR WITH INSTRUCTION PACKAGES AND RESULT PACKAGES

[75] Inventors: Robert Yung, Fremont, Calif.; Robert F. Sproull, Newton, Mass.

[73] Assignee: Sun Microsystems, Inc., Mountain View, Calif.

[21] Appl. No.: 520,281

[22] Filed: Aug. 26, 1995

Related U.S. Application Data

[63] Continuation-in-part of Ser. No. 477,533, Jun. 7, 1995, Pat. No. 5,600,848, which is a continuation of Ser. No. 140,655, Oct. 21, 1993, abandoned, and Ser. No. 208,526, Mar. 8, 1994, abandoned.

[51] Int. Cl.[6] ........................................ G06F 9/38
[52] U.S. Cl. ...................... 395/393; 395/394; 395/800
[58] Field of Search ................................. 395/800, 377, 395/392, 393, 394, 395

[56] References Cited

U.S. PATENT DOCUMENTS 5,471,591  11/1995  Edmondson et al. ............... 395/393
5,488,729   1/1996  Vegesna et al. .................... 395/800
5,574,939  11/1996  Keckler et al. ..................... 395/800

*Primary Examiner*—Parshotam S. Lall
*Assistant Examiner*—Viet Vu
*Attorney, Agent, or Firm*—James W. Rose

[57] ABSTRACT

A counterflow pipeline having a scoreboard table and a register file is disclosed. In the counterflow pipeline, information flows in two directions. Instructions flow up the pipeline during execution. The results from previous instructions flow down the same pipeline. As an instruction meets a result that is needed by that instruction, that result is garnered. The scoreboard table maintains a record of the registers values that are being recomputed in the counterflow pipeline at any given point in time. When a new instruction enters the counterflow pipeline, the register values it needs are compared to the record of register values being recomputed or otherwise stored in the scoreboard table. If a match occurs, the source value is not fetched from the register file. Rather, the needed source value is garnered in the counter flow pipeline. By this procedure, the number of times the register file need be accessed is significantly reduced.

29 Claims, 6 Drawing Sheets

Instruction Package
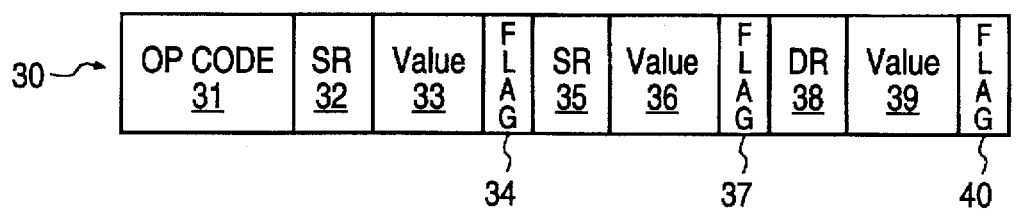
FIG. 2
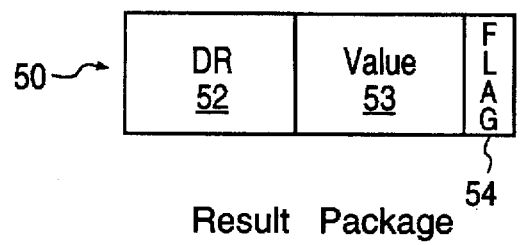
Result Package
FIG. 3
| Register Identifier | Value | Status |
|---|---|---|
| 62(1) | 64(1) | 66(1) |
| 62(2) | 64(2) | 66(2) |
| ⋮ | ⋮ | ⋮ |
| ⋮ | ⋮ | ⋮ |
| 62(n) | 64(n) | 66(m) |
FIG. 5

SCOREBOARD TABLE FOR A COUNTERFLOW PIPELINE PROCESSOR WITH INSTRUCTION PACKAGES AND RESULT PACKAGES

RELATED APPLICATIONS

This is a continuation in part application Ser. No. 08/477,533 entitled "Counterflow Pipeline Processor for Executing Computer Instructions", filed Jun. 7, 1995, U.S. Pat. No. 5,600,848, which is a continuation of application Ser. No. 08/140,655, entitled "Counterflow Pipeline Processor", filed Oct. 21, 1993, abandoned, and a continuation of application Ser. No. 08/208,526 entitled "Scoreboard Table for a Counterflow Pipeline Processor", filed Mar. 8, 1994, abandoned.

BACKGROUND OF THE INVENTION

1. Field of the Invention

The present invention relates to computer systems, and more particularly, to a microprocessor having a counterflow pipeline, a register file, and a register file scoreboard table for maintaining a record of the registers whose values are in the counter flow pipeline.

2. Background of the Invention

Microprocessors run user defied computer programs to accomplish specific tasks. All programs, regardless of the task, are composed of a series of instructions. State-of-the-art microprocessors execute instructions using a multi-stage pipeline. Instructions enter at one end of the pipeline, are processed through the stages, and the resets of the instructions exit at the opposite end of the pipeline. The standard pipeline includes an instruction fetch stage, an instruction decode and register fetch stage, an execution stage, a memory access stage and a write-back stage. The pipeline increases the number of instructions being executed simultaneously, and thus the overall processor throughput is improved. A superseder processor is a processor that includes several pipelines arranged to execute several streams of instruction at the same time.

Control and data hazards are a problem with superseder pipelined processors. Control and data hazards occur when instructions are dependent upon one another. Consider a first pipeline executing a first instruction and the first instruction specifies a destination register (X). A second instruction, to be executed by a second pipeline, is said to be dependent if it needs the contents of register (X). If the second pipeline were to use the contents of register (X), prior to the completion of the first instruction, an incorrect outcome may be obtained because the data in register (X) may be out-of-date. The simple approach to avoid data hazard problems is to stall the execution of the second instruction, until the needed result of the first pipeline is executed, placed in register (X) , and becomes available. A more sophisticated approach, called forwarding, involves the multiplexing of the outputs of every stage in each pipeline. If the results of one pipeline is calculated at an intermediate stage, it is forwarded and becomes immediately available for other dependent instructions. This helps reduce the stall time of a pipeline waiting for a result, but does not eliminate the problem.

SUMMARY OF THE INVENTION

The present invention relates to a multi-stage counterflow pipeline microprocessor having a register file and a scoreboard table. In the counterflow pipeline, information flows in two directions. Instructions in "instruction packages" flow up the stages of the counterflow pipeline during execution and the results from previous instructions flow down the stages of the counterflow pipeline in "result packages". Instruction packages include an operation (OP) code, a source register (SR) identifier or identifiers, a source register value or values, a destination register (DR) identifier, and a destination register value. A result package includes a DR identifier and a DR value.

The scoreboard table includes a register identifier column, a register value column, and a status column. The status column can hold either a VALID, INPIPE or FLUSH flag. The VALID flag signifies that the value for the identified register is up-to-date. The INPIPE flag signifies that the value for the identified register is being recomputed in the counterflow pipeline. The FLUSH flag signifies that the entry in the table has been nullified due to an abrupt change in the program order, such as that caused by a trap or a mispredicted branch. If a register is not entered in the scoreboard table, it is treated as an INVALID entry in the table.

During operation, the scoreboard table is checked to determine if the needed source registers of an instruction package are in the scoreboard table before the instruction package enters the counterflow pipeline. If a needed source register is in the table and has a VALID status, that register and its corresponding value is immediately provided to the instruction package by the scoreboard table. If the needed register has an INPIPE status, the instruction package proceeds into the pipeline and the needed value is obtained or "garnered" in the pipeline. If the needed register has an INVALID or FLUSH status, the needed value is provided by the register file.

In the counterflow pipeline, the instruction package and the result package are compared at each stage. A match of the SR identifier(s) of the instruction package with the DR identifier of the result package indicates that the result package is carrying a result that is needed by the instruction package. In response to the match, the value of the DR of the results package is garnered by the instruction package. The DR of the instruction package is also compared with the DR identified in the results package. A match indicates that the value of the DR identified in the instruction package has or will be recomputed. The stage where a match occurs "kills" the value of the DR in the results package. The killed result is thus prevented from further interaction with younger instruction packages in the program order.

The scoreboard table of the present invention provides several significant advantages in the counterflow pipeline processor. Statistical studies indicate that a majority of certain types of instructions are highly dependent upon one another. As a result, there is a high likelihood that the registers needed by such instructions will be in the scoreboard table. The efficiency of the counterflow pipeline processor is increased because the frequency in which the register file needs to be accessed is significantly reduced. As an additional benefit, fewer ports to the register file are needed, and less die area is used in the design and layout of the ports for the register file.

DESCRIPTION OF THE DRAWINGS

The objects, features and advantages of the apparatus and method of the present invention will be apparent from the following description in which:

FIG. 2 illustrates an instruction package used in the counterflow pipeline of the present invention.

FIG. 3 illustrates a result package used in the counterflow pipeline of the present invention.

FIG. 5 illustrates a scoreboard table used in the counterflow pipeline of the present invention.

DESCRIPTION OF THE PREFERRED EMBODIMENT

Figure 1:
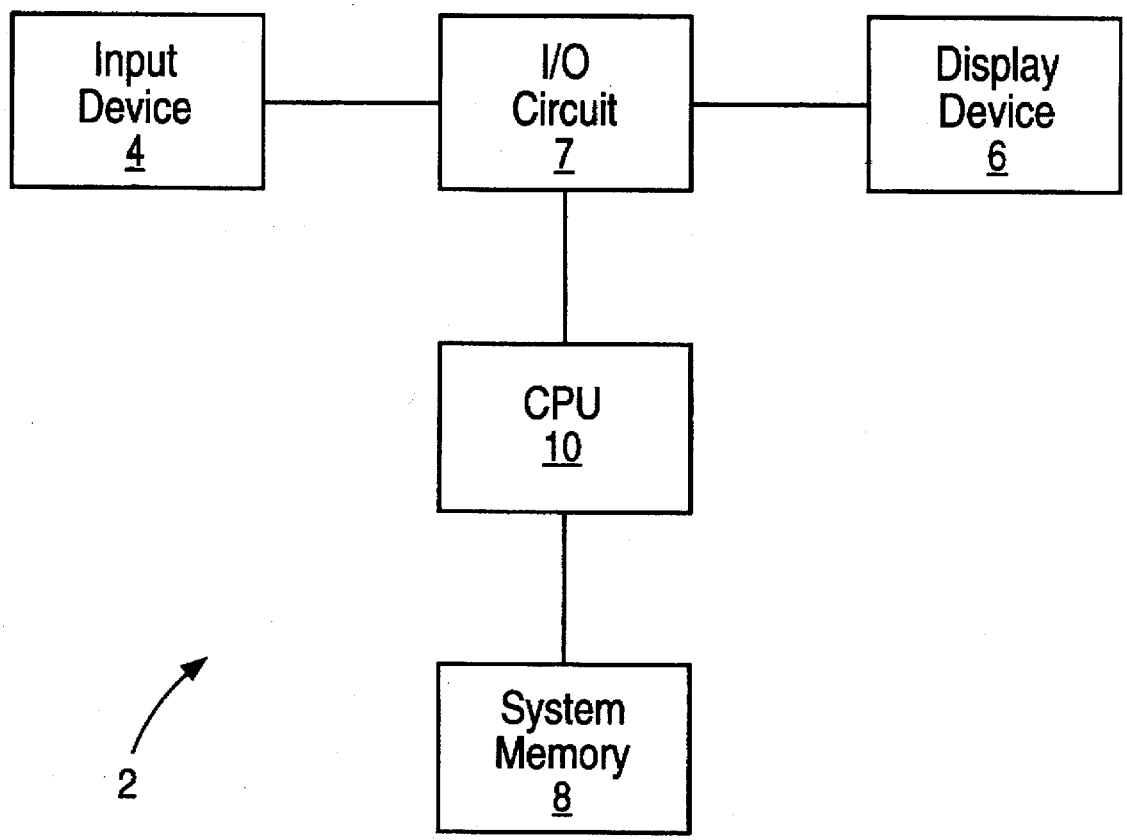
FIG. 1 is a block diagram of a computer system of the present invention.

Referring to FIG. 1, a block diagram of a computer system of the present invention is shown. The computer system 2 includes an input device 4, a display device 6, an input/output (I/O) circuit 7, system memory 8, and a central processing unit (CPU) 10. Since the basic operation of the computer system 2 is well known, a detail description is not provided herein. In one embodiment, the counterflow process or 10 is based on a scalable process or architecture (SPARC). For more information on SPARC, including the SPARC instruction set, see for example "The SPARC Architecture Manual", Version 8, SPARC International, 1992, incorporated by reference herein. It should be noted that the present invention may be based on any microprocessor architecture and may use any type of instruction set, including complex (CISC) or reduced (RISC) instructions sets.

According to the present invention, the CPU 10 is a counterflow processor. U.S. patent application Ser. No. 08/140,654, entitled "Counterflow Pipeline", filed Oct. 21, 1993 U.S. Pat. No. 5,572,690, and U.S. patent application Ser. No. 08/140,655, entitled "Counterflow Pipeline Processor", filed Oct. 21, 1993 abandoned, describe respectively a novel counterflow pipeline design and a microprocessor architecture based on the same. This design departs from traditional pipeline designs in that information flow is bi-directional. Instruction packages flow up the pipeline during execution. The results from previous instructions flow down the same pipeline in result packages. As an instruction meets a result that is needed by that instruction, that result is copied. This process, which is referred to as "garnering", substantially eliminates the stall problem. The above-identified patent applications, incorporated by reference herein, are assigned to Sun Microsystems, Inc., Mountain View Calif., assignee of the present application. For a detailed explanation of the counterflow pipeline and its advantages, the above-identified applications should be reviewed.

Referring to FIG. 2, an instruction package used in the CPU 10 is shown. The instruction package 30 includes an OP Code field 31, a first SR identifier field 32, a first value field 33, a first flag 34, a second SR identifier field 35, a second value field 36, a second flag 37, a DR identifier field 38, a value field 39, and a third flag 40. The OP code field 31 holds the instruction of the instruction package 30. The fields 32 and 35 hold an identifier for the SR operands, such as a physical register number, a virtual register number, or any other identifier. The fields 33 and 36 hold the values for these SR operands respectively. The flags 34 and 37 indicate if a particular instruction package 30 uses the SRs as identified in fields 32 and 35 respectively. The field 38 holds the identifier for the DR, field 39 holds the value for that DR register, and flag 40 indicates if the the instruction package 30 specifies a DR. For example, with an ADD instruction (e.g. ADD SR1, SR2→SR3), the flags 35, 37 and 39 are all set because the registers SR1, SR2 and DR3 are all required for the execution of the ADD instruction. On the contrary, for a SET HIGH instruction (i.e., SETHI DR4), only the third flag 40 is set since only the DR identified in field 38 is required for the execution of this instruction.

Referring to FIG. 3, a result package used in the CPU 10 is shown. The result package 50 includes a DR identifier field 52, a value field 53 and a flag 54. Field 52 holds an identifier for the DR, such as a physical register number, a virtual register number, or any other identifier. The value field 53 holds the contents of the particular DR identified in field 52. The flag 54 indicates whether a particular results package 50 includes a DR as identified in field 52. Certain instructions, such as a NO OPERATION instruction, do not specify a destination register. Accordingly, the flag 54 is reset with such an instruction. In accordance with an alternative embodiment of the invention, if such an instruction does not identify a DR, then a result package 50 is not created for that instruction.

Figure 4:
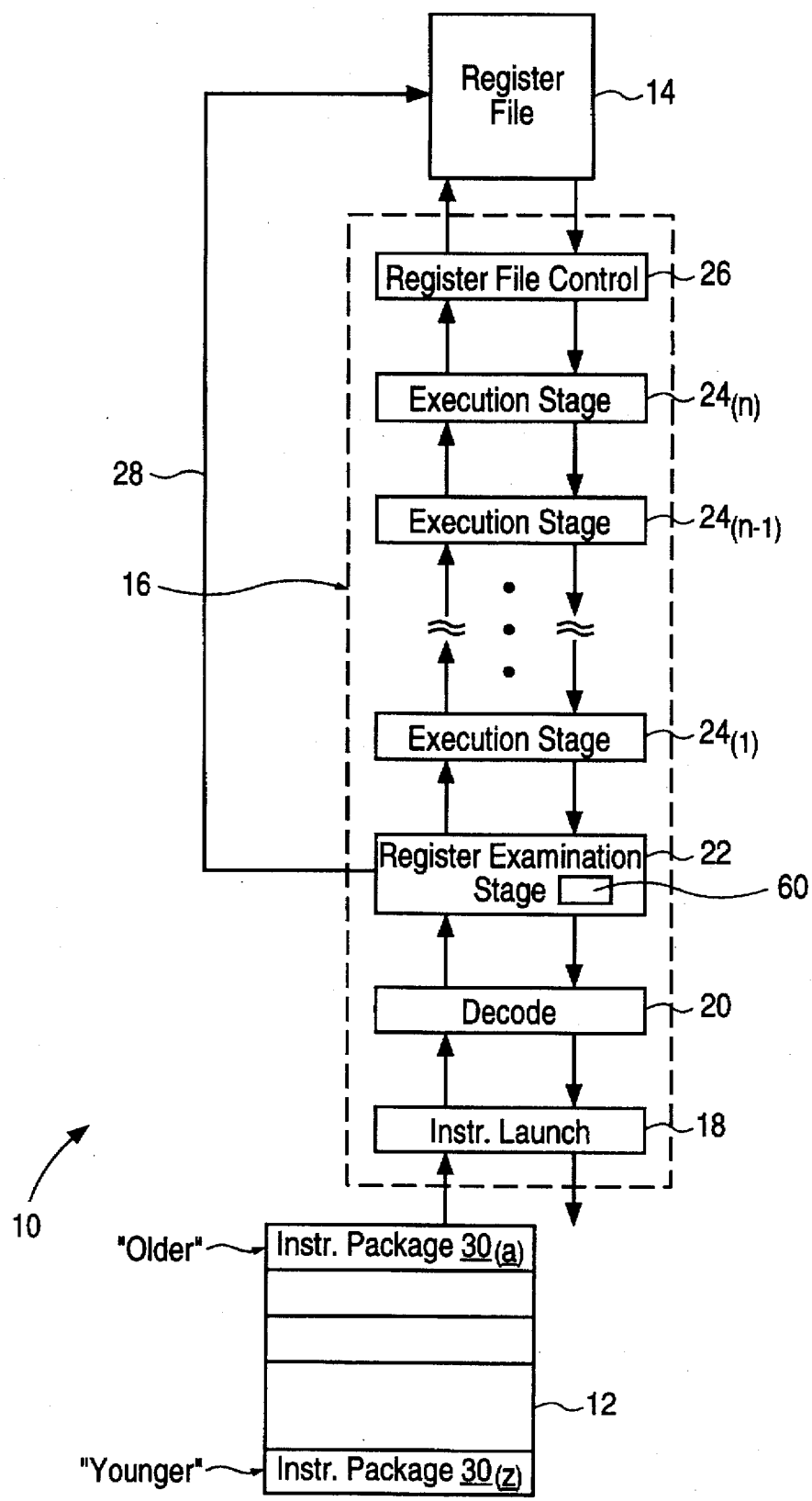
FIG. 4 illustrates a simplified block diagram of the counterflow pipeline of the present invention.

A simplified description of the relevant portions of the CPU 10 is included herein for the purpose of providing background information for the present invention. Referring to FIG. 4, a simplified counterflow pipeline in the CPU 10 is shown. The CPU 10 includes a buffer 12, a register file 14, and a counterflow pipeline 16. The counter flow pipeline 16 has a plurality of stages, including an instruction launch stage 18, a decode stage 20, a register examination stage 22, a plurality of execution stages $24_{(I)}$ through $24_{(n)}$, and a register file control stage 26. A scoreboard table 60 is contained in the register examination stage 22. A bi-directional electrical connection 28 is coupled between the register examination stage 22 and the register file 14. A discussion of each stage in the counterflow pipeline 16 is provided below.

Buffer 12

The instruction packages 30 to be executed by the counterflow pipeline 16 are stored in the buffer 12 in fetch order. It should be noted that an instruction package $30_{(a)}$ at the top of the buffer 12 is sometimes referred to as an "older" instruction and an instruction package $30_{(c)}$ at the bottom of the buffer 12 is sometimes referred to as a "younger" instruction. The instruction near the top is considered "older" because it is launched into the pipeline 16 prior to the instruction below it in the program order.

Register File 14

The register file 14 is a set of registers physically located in close proximity to the counterflow pipeline 16. The final results of instruction packages 30 are stored in the register file 14. These final results are readily accessible to the counterflow pipeline 16. The physical registers (not shown) in the register file are typically designated by numbers in consecutive order.

Instruction Launch 18

The instruction launch stage 18 is responsible for controlling the launch of the instruction packages 30 from the buffer 12 into the counterflow pipeline 16. This is typically, but not necessarily, done sequentially, i.e., the first instruction package 30 in buffer 12 is the first instruction package 30 out. The issue order may change if an interrupt, call or other branch routine occurs.

Decode 20

The Decode stage 20 is responsible for ascertaining the OP code found in field 31 of an instruction package 30 after being launched into the counterflow pipeline 16. This stage determines if the instruction is a data transfer operation (e.g., LOAD or STORE), an arithmetic operation (e.g., ADD, SUBTRACT), a logical operation (e.g., OR, AND), a floating point operation (i.e., MULTIPLY, DIVIDE) or a control transfer operation (e.g., CALL, JUMP).

Register Examination 22

The register examination stage 22 is responsible for examining the SR identified in fields 32, 35 and the DR identified in field 38 of the instruction packages 30. In the ADD instruction example (i.e., ADD SR1, SR2, SD3), the SR operands to be added are contained in source registers SR1 and SR2. The sum, which is calculated in the execution stages 24 of the counterflow pipeline 16, is stored in the destination register DR3. In other types of instructions, such as a SETHI, no SR is required. With other instructions, such as NO OPERATION (NOP), no DR is required.

Execution Stages $24_{(l)}$ through $24_{(n)}$

In the execution stages $24_{(l)}$ through $24_{(n)}$, the instruction packages 30 are executed. Different stages 24 in the counterflow pipeline are capable of executing different types of instructions in the instruction set. For example, one of the stages 24 may be used to execute arithmetic instructions, and another stage 24 may be used for LOAD or STORE instructions, another stage may be used for logical instructions, another stage 24 may be used for floating point instructions, and yet another stage may be used for control transfer instructions. In the plurality of execution stages $24_{(l)}$ through $24_{(n)}$, at least one stage 24 must be capable of executing each type of instruction in the instruction set.

Register File Control 26

The register file control stage 26 is responsible for storing the result of an instruction package 30 into the appropriate DR in register file 14. The register file control stage 26 is also responsible for creating the results stream by creating the result packages 50 by accessing the register file 14 and placing the result packages 50 into the counterflow pipeline 16. Thereafter, the result package sequences down the stages of the counterflow pipeline 16 and then eventually exits the pipeline 16 after the instruction launch stage 18.

During operation, an instruction packages 30 is launched into the counterflow pipeline 16. At the register examination stage 22, the SR operands identified in fields 32, 35 and the DR identified in field 38 of the instruction package 30 are ascertained. The above-mentioned co-pending applications set forth several ways in which the values of the identified SR operands for an instruction package 30 are obtained.

a. In one embodiment, the register file control stage 26 is programmed to periodically access the register file 14 and issue result package 50 for each register in the register file 14. Eventually, all register values will be reissued, and the needs of any instruction package 30 waiting for SR values will be satisfied.

b. In another embodiment, the register examination stage 22 sends the addresses for the identified SR operands of the instruction package 30 to the register file 14. In response, the corresponding result packages 50 for those registers are issued into the results stream of the counterflow pipeline 16. The instruction package 30 thereafter garners the needed result from the stream of result packages 50 in the counterflow pipeline 16.

c. In another embodiment, the register examination stage 22 requests the SR operands as identified in fields 32, 35 from the register file 14 by way of the bi-directional electrical connection 28. In response thereto, the register file 14 sends the needed SR values for the identified registers back to the register examination stage 22.

d. In yet another embodiment, a memory of identified registers whose values are or will be available to instruction packages 30 entering the counterflow pipeline 16 is provided at an early stage of the pipeline processor 16. The present invention, as described below, sets forth one possible implementation for such a memory.

Referring to FIG. 5, a scoreboard table is shown. The scoreboard table 60 is maintained in the register examination stage 22 of the counterflow pipeline 16. The scoreboard table 60 includes a register identifier column 62, a value column 64, and a status column 66. The register identifier column 62 identifies a register of the register file 14. The value column 64 holds the value for the corresponding identified register in column 62. The status column entry 66 hold either a "VALID", "INPIPE", or "FLUSH" flag for the current value 64 in the register identified in column 62. The scoreboard table 60 includes (m) entries.

The VALID flag signifies that the value 64 for the corresponding identified register in column 62 is up-to-date and is therefore immediately available for an instruction package 30 entering the register examination stage 30. For example, if an instruction package 30 needs SR1 as an operand and this register is identified and has a VALID status in the the scoreboard table 60, then the value of SR1 is immediately available for the instruction package 30. The need to obtain the SR operand from the register file 14 is avoided.

The INPIPE flag in column 66 signifies that the value 64 of a register identified in column 62 is being recomputed in the counterflow pipeline 16. This means that if an instruction package 30 needs the contents of a particular identified register in column 62 with an INPIPE status, the corresponding value in column 64 can be garnered in the counterflow pipeline 16. As such, the instruction package 30 is allowed to enter the execution stages 24 without the SR operand identified in either field 32 or 35. Again, there is no need to obtain the SR operand from the register file 14.

The FLUSH flag in column 66 signifies that the value 64 of a register identified in column 62 has been nullified. A FLUSH entry is created when a trap or a branch misprediction is detected.

If a SR operand as specified in fields 32, 35 of an instruction package 30 is not in the scoreboard table 60, it is treated as an INVALID entry. When a specified SR has an INVALID or FLUSH status, the register value is obtained in one of the ways as discussed above (see paragraphs labelled a through c). In this manner, the specified SR operand is obtained for the instruction package 30.

After the instruction examination stage 22, the instruction package 30 enters the execution stages $24_{(l)}$ through $24_{(n)}$. The instruction packages 30 flow up the counterflow pipeline 16 in the program order. At the same time, the result packages 50 from older instructions flow down the counterflow pipeline 16 and are not allowed to change relative positions. The instruction packages 30 and the result packages 50 meet at each stage in the counterflow pipeline 16.

The instruction package 30 and the result package 50 are compared at each stage. A match of either of the SR operands identified in fields 32 or 35 of the instruction package 30 with the DR identified in field 52 of the result package 50 indicates that the result package 50 is carrying a result that is needed by the instruction package 30. In response to the match, the value in field 53 of the results package 50 is copied into the corresponding value field 33 or 36 of the instruction package 30, as the case may require. By this process, the instruction package 30 is able to garner the values it needs from the result stream.

At each stage, the DR identified in field 38 in the instruction package 30 is also compared with the DR identified in field 52 in the results package 50. Any match indicates that the instruction package 30 has or will recompute the value 53 associated with the DR identified in field 52 of the result package 50. The stage, where a match occurs, "kills" the value 53 in the results package 50. This is accomplished in one embodiment of the present invention by resetting the flag 54 of the result package 50. The killed result is thus prevented from further interaction with younger instruction packages 30 in the program order.

Updating the scoreboard table 60 is required to optimize the operation of the counterflow pipeline 16. This is accomplished by following a SR flow sequence, a DR flow sequence, and a result package flow sequence. Each of these flow sequences is described below. It should be noted that the flow sequences may be implemented in either hardware or software.

Figure 6:
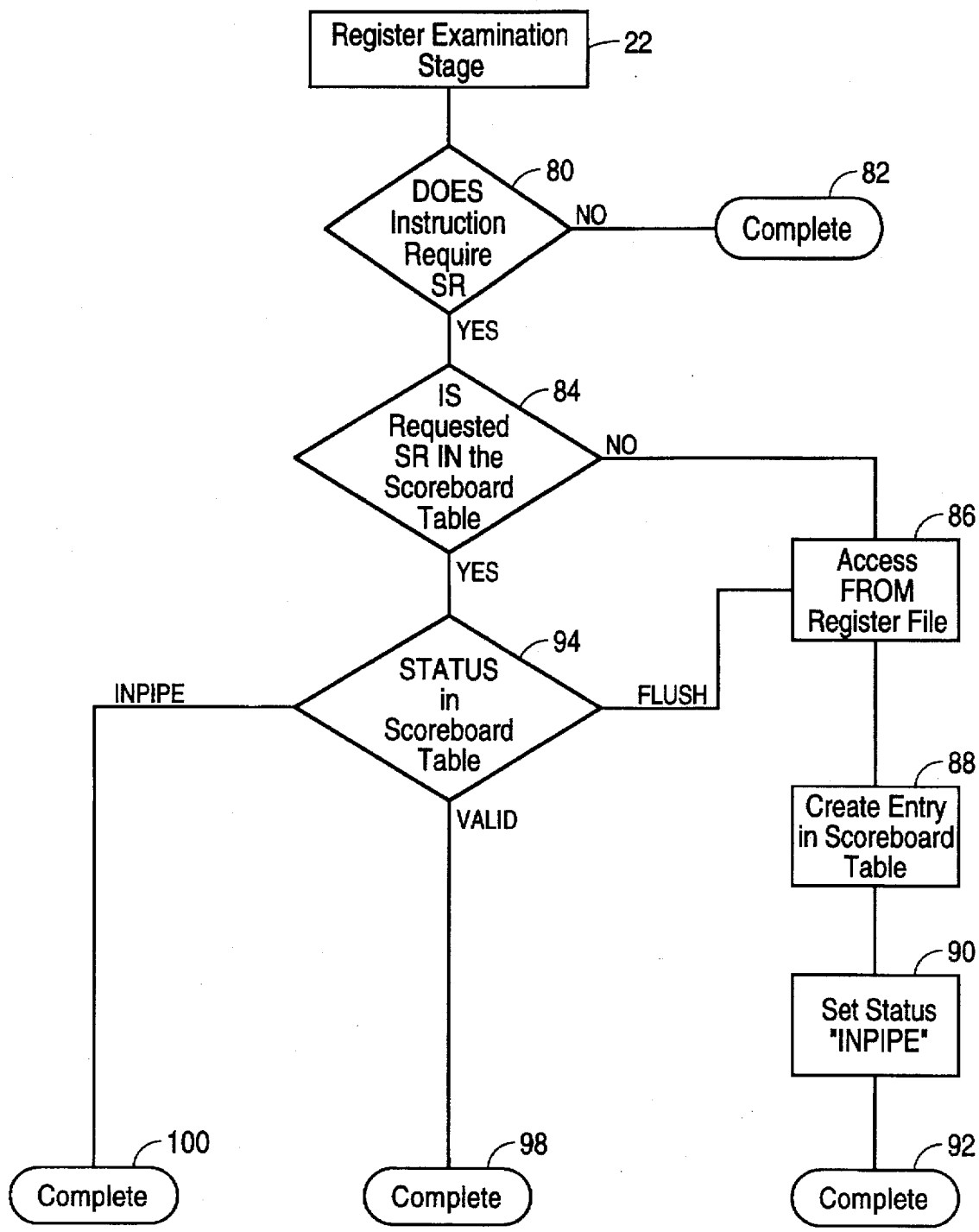
FIG. 6 illustrates a source register flow sequence for updating the register table with respect to entries in the scoreboard table of the present invention.

Referring to FIG. 6, the SR flow sequence is shown. The register examination stage 22 determines if the instruction package 30 specifies a SR operand (decision diamond 80). This is accomplished by checking the status of the flags 34 and 37 of the instruction package 30. If both flags are reset, indicating that the instruction package 30 does not require a SR operand, the flow sequence is complete (oval 82). If the instruction package specifies a SR operand as identified in field 32 or 35, the next step is to check if the specified SR 32 is an entry in the scoreboard table 60 (decision diamond 84). If the specified SR is INVALID, meaning it is not an entry in the scoreboard table 60, the register file 14 is accessed and the SR is fetched by one of the above mentioned methods as set forth in the paragraphs labelled a through c (box 86). Thereafter, a new entry is created in column 62 for the fetched SR in the scoreboard table 60 (box 88), its status is set to INPIPE (box 90), and this branch of the flow sequence is complete (oval 92). On the other hand, if the scoreboard table 60 contains the specified SR (decision diamond 84) and its status is valid (decision diamond 94), the corresponding SR value 64 is immediately transferred to the instruction package 30. The status entry 66 in the scoreboard table 60 remains VALID and this branch of the flow sequence is complete (oval 98). If the status entry 66 for the specified SR is FLUSH, it is handled as an INVALID entry as described above. Finally, if the status entry 66 for the specified SR already is INPIPE, no action is taken (oval 100) because the value of the SR will be garnered in the counter flow pipeline 16. This sequence is repeated for every SR operand identified in the instruction package 30 entering the examination stage 22.

Figure 7:
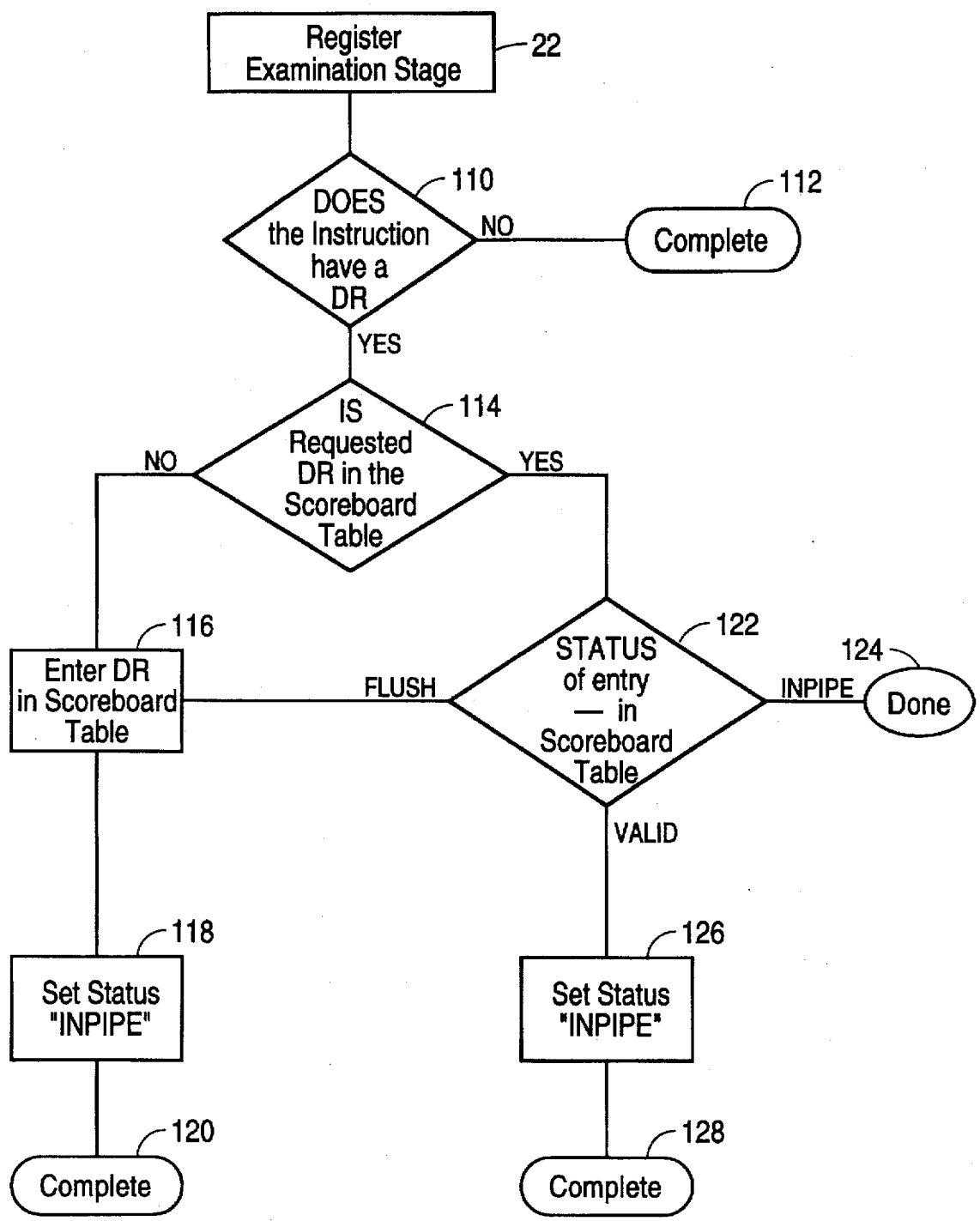
FIG. 7 illustrates a destination register flow sequence for updating the register table with respect to entries in the scoreboard table of the present invention.

Referring to FIG. 7, the DR flow sequence is shown. At the register examination stage 22, the flag 40 of an instruction package 30 is checked to see if a DR is specified in field 38 (diamond 110). If the instruction package 30 does not specify a DR, the flow sequence is complete (oval 112). If the instruction package specifies a DR, the next step in the flow sequence is to check to see if the specified DR is an entry in column 62 of the scoreboard table 60 (decision diamond 114). If the specified DR is not found in the scoreboard 60 (i.e., INVALID), an entry is created in column 62 of the scoreboard table 60 (box 116), and the status of the corresponding entry in column 66 is set to INPIPE (box 118), completing this branch of the flow sequence (oval 120). On the other hand, if the scoreboard table 60 already contains an entry for the specified DR, the status of the entry is determined (decision diamond 122). If the status is INPIPE, the flow sequence is complete (oval 124). If the status is VALID, the status is changed to INPIPE (box 126), and the flow sequence is complete (oval 128). The status is changed from VALID to INPIPE because the instruction package 30 will update the value of the DR in the counterflow pipeline 16. Accordingly, if a younger instruction package 30 needs that register, the INPIPE status indicates that that register will be garnered in the counterflow pipeline 16. If the status is FLUSH, it is handled the same way as an INVALID entry as described above. This sequence is repeated for every DR identified in each instruction package 30 entering the register examination stage 22.

Figure 8:
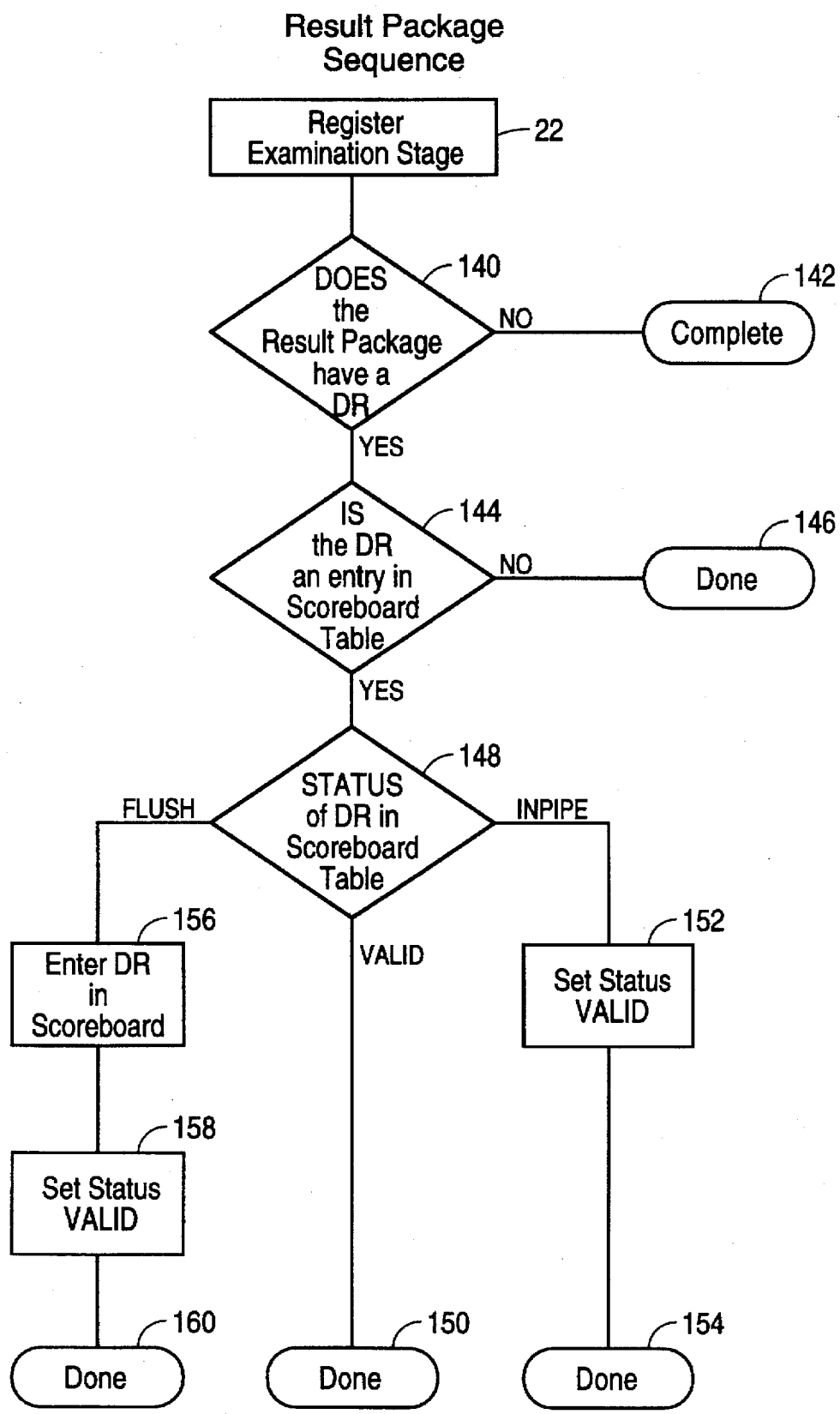
FIG. 8 illustrates a results package flow sequence for updating the register table with respect to entries in the scoreboard table of the present invention.

Referring to FIG. 8, a flow sequence for the results package 50 is shown. This sequence occurs after a results package 50 sequences down the stages of the counterflow pipeline 16 and enters the register examination stage 22. The register examination stage 22 checks flag 54 and determines if a DR is identified in field 52 of the result package 50 (decision diamond 140). If the flag 54 of the result package 50 is reset, indicating that no DR is specified or the result package has been killed, the flow sequence is complete (oval 142). If the result package 50 specifies a DR, the next step in the sequence is to determine if the specified DR is an entry in the column 62 of the scoreboard table 60 (decision diamond 144). If the DR is not in the table, the flow sequence, according to one embodiment, is complete (oval 146). If the DR is in the table, its status in column 66 is determined (decision diamond 148). If the status is VALID, the flow sequence is complete (oval 150). If the status is INPIPE, it is set to VALID (box 152) and the flow sequence is complete (oval 154). If the status is FLUSH, an entry is created in column 62 of the scoreboard table 60 (box 156), the status of the new entry is set to VALID (box 158), and this branch of the flow sequence is complete (oval 160). In the INPIPE and FLUSH situations, the value in field 53 in the result package 50 is transferred to the corresponding entry column 64 in the scoreboard table 60. As a result, the value for the register identified in field 52 is immediately available for a younger instruction package 30 entering the register examination stage 22. This sequence is repeated for every DR in a result package 50 entering the register examination stage 22.

In an alternative embodiment of the flow sequence of FIG. 7, an entry in the table for the DR can be created and with its status set to INPIPE if the DR was not previously an entry in the scoreboard table. This embodiment has the advantage of creating a new entry in the scoreboard table 60. However, such an entry may replace another entry in the scoreboard table 60 that has a higher probability of being used by a younger instruction package 30.

In the embodiment described above, the source register (SR) identifiers and the destination register (DR) identifiers correspond to specific registers in the register file 14. It should be noted that these identifiers may correspond to any location within the computer 2, such as memory locations, where the source operands and the results of instructions may be stored.

According to various embodiments of the invention, the number of entries in the scoreboard table 60 may vary. In one embodiment, the number of entries can equal a predetermined number, such as eight or sixteen (m=8 or 16). In this embodiment, an entry replacement algorithm, such as first-in-first-out (FIFO), least recently used (LRU), hashing, random, or round-robin is required. As a new entry is inserted into the scoreboard table 60 during operation, an old entry can be replaced by one of the above defined algorithms.

In other embodiment, the number of entries in the scoreboard table 60 may equal the number of physical entries in the register file 14. With this embodiment, the use of replacement algorithms is not needed. However, the design and layout of the scoreboard table 60 on a semiconductor die containing the pipeline processor 16 is more complex, due to the size of the table.

In the event of a trap or a branch misprediction, the register table 60 must be flushed. A trap is a vectored transfer of control of the operating system of the computer 2 due to an external interrupt or an instruction exception. When a trap occurs, the current state of the registers is saved, and control of the counterflow pipeline 16 is transferred over to the trap exception routine. A misprediction occurs with the speculative execution of a branch instruction. With a branch instruction, the CPU 10 may speculate as to the outcome of the branch and may begin the execution of the instructions after the branch in anticipation that it will be the correct prediction. A misprediction occurs when the speculation is wrong, and the executed instructions after the branch must be invalidated.

The scoreboard table 60 can be flushed in either of two ways, either globally or selectively. With a global flush, all the register identifiers in the table are nullified by setting the flag 66 to FLUSH for each entry in the scoreboard table 60. In a trap situation for example, the contents of the scoreboard table 60 may be copied and saved elsewhere in the CPU 10. When execution of the trap begins, the scoreboard ruble 60 entries are nullified, and the table is then fried up by the instructions of the trap routine. When the execution of the trap is complete, the saved contents may be returned to the scoreboard table 60 and normal execution of the program order may resume. With selective flush only pertinent entries in the scoreboard table are flushed. For example, with a misprediction, only the entries in the table that have been created after the branch are nullified by setting their corresponding flags 66 to FLUSH. The remainder of the entries in the table remain intact.

While this invention has been described in relationship to the embodiments described in the accompanying specification, other alternatives, embodiments, and modifications will be apparent to those skilled in the art. It is intended that the specification be only exemplary, and that the true scope and spirit of the invention be indicated by the following claims.

What is claimed is:

1. An apparatus, comprising:
   a counterflow pipeline comprising:
      a plurality of stages;
      execution circuitry for executing, in the plurality of stages, instructions having associated therewith operand identifiers and for placing results of the executed instructions into result packages specifying one of the operand identifiers;
      direction circuitry for directing the result packages in a results stream flowing in the opposite direction as the instructions through the plurality of stages in the counterflow pipeline; and
      interaction circuitry for causing the instructions and the result packages to interact in the plurality of stages of the counterflow pipeline;
      a memory for storing operand identifiers of instructions inserted into the counterflow pipeline.

2. The apparatus of claim 1, wherein the counterflow pipeline further comprises examination circuitry for examining the operand identifiers associated with the instructions and compare circuitry for comparing the operand identifiers in the memory with the operand identifiers associated with the instructions.

3. The apparatus of claim 2, wherein the examination circuitry further comprises transfer circuitry for transferring an operand value associated with one of the operand identifiers in the memory to one of the instructions having the same one of the operand identifiers associated therewith.

4. The apparatus of claim 2, wherein the examination circuitry further comprises logic circuitry for determining if an operand value associated with one of the operand identifiers in the memory is being recomputed in the counterflow pipeline.

5. The apparatus of claim 1, wherein the memory comprises a table having an operand identifier entry, a value entry and a status entry.

6. The apparatus of claim 5, wherein the status entry is a VALID flag for the operand identifiers having up-to-date operand values in the table.

7. The apparatus of claim 5, wherein the status entry is an INPIPE flag for the operand identifiers having operand values in the counterflow pipeline.

8. The apparatus of claim 5, wherein the status entry is a FLUSH flag for the operand identifiers having operand values that are nullified.

9. The apparatus of claim 5, wherein if a specified operand identifier is not included in the table, the specified operand identifier has an INVALID status.

10. The apparatus of claim 1, further comprising an operand file associated with the counterflow pipeline.

11. The apparatus of claim 1, further comprising a logic element for updating the memory with the different ones of the operand identifiers.

12. The apparatus of claim 11, wherein the logic element creates an entry in the memory for the operand identifiers associated with the instructions inserted into the counter flow pipeline.

13. The apparatus of claim 11, wherein the logic element creates an entry in the memory for the operand identifiers specified by the result packages.

14. The apparatus of claim 1, wherein the instructions further comprise an instruction package including one or more of the following: an operation code field; a source operand field; a source value field; a destination location field; a destination value field; or a status flag field.

15. The apparatus of claim 1, wherein the result package includes one or more of the following: a destination location field; a value field; or a status flag field.

16. The apparatus of claim 1, further comprising a microprocessor containing the counterflow pipeline.

17. The apparatus of claim 1, further comprising a central processing unit containing the counterflow pipeline, an input device, an output device, and system memory coupled to the central processing unit.

18. A method, comprising the steps of:
   providing a counterflow pipeline comprising:
      providing a plurality of stages;
      providing execution circuitry for executing, in the plurality of stages, instructions having associated therewith operand identifiers and for placing results of the executed instructions into result packages specifying one of the operand identifiers;

providing direction circuitry for directing the result packages in a results stream flowing in the opposite direction as the instructions through the plurality of stages in the counterflow pipeline; and providing interaction circuitry for causing the instructions and the result packages to interact in the plurality of stages of the counterflow pipeline;

providing a memory for storing operand identifiers of instructions inserted into the counterflow pipeline.

19. The method of claim 18, further comprising the step of providing in the counterflow pipeline examination circuitry for examining the operand identifiers associated with the instructions and compare circuitry for comparing the operand identifiers in the memory with the operand identifiers associated with the instructions.

20. The method of claim 19, further comprising the step of providing transfer circuitry for transferring an operand value associated with one of the operand identifiers in the memory to one of the instructions having the same operand identifier associated therewith.

21. The method of claim 19, further comprising the step of providing logic circuitry for determining if an operand value associated with one of the operand identifiers in the memory is being recomputed in the counter flow pipeline.

22. The method of claim 18, further comprising the step of providing in the memory a table having an operand identifier entry, a value entry and a status entry.

23. The method of claim 18, further comprising the step of providing a microprocessor containing the counterflow pipeline.

24. The method of claim 18, further comprising the steps of providing a central processing unit containing the provided counterflow pipeline, an input device, an output device, and system memory coupled to the central processing unit.

25. A method of operating a computer having a central processing unit having a plurality of stages, comprising the steps of:

executing, in the plurality of stages, instructions having associated therewith operand identifiers;

placing results of the executed instructions into result packages specifying one of the operand identifiers;

directing the result packages in a results stream flowing in the opposite direction as the instructions in the plurality of stages in the counterflow pipeline;

causing the instructions and the result packages to interact in the plurality of stages of the counterflow pipeline; and storing operand identifiers of instructions inserted into the counterflow pipeline.

26. The method of claim 25, further comprising the steps of examining the operand identifiers of the instructions and comparing the operand identifiers in the memory with the operand identifiers of the instructions.

27. The method of claim 25, further comprising the step of transferring an operand value associated with one of the operand identifiers in the memory to one of the instructions having the same operand identifier associated therewith.

28. The method of claim 26, further comprising the step of determining if an operand value associated with one of the register identifiers in the memory is being recomputed in the counterflow pipeline.

29. The method of claim 25, further comprising the step of setting a status flag for each one of the operand identifiers stored in the memory.

* * * * *